(12) United States Patent
Kamon et al.

(10) Patent No.: US 12,090,630 B2
(45) Date of Patent: Sep. 17, 2024

(54) ROBOT SYSTEM

(71) Applicant: Kawasaki Jukogyo Kabushiki Kaisha, Kobe (JP)

(72) Inventors: Masayuki Kamon, Kobe (JP); Hirokazu Sugiyama, Kobe (JP); Hidenori Tani, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 291 days.

(21) Appl. No.: 17/783,650

(22) PCT Filed: Dec. 11, 2020

(86) PCT No.: PCT/JP2020/046295
§ 371 (c)(1),
(2) Date: Jun. 9, 2022

(87) PCT Pub. No.: WO2021/117871
PCT Pub. Date: Jun. 17, 2021

(65) Prior Publication Data
US 2023/0010975 A1    Jan. 12, 2023

(30) Foreign Application Priority Data
Dec. 13, 2019    (JP) .................................. 2019-225563

(51) Int. Cl.
*B25J 13/02* (2006.01)
(52) U.S. Cl.
CPC .................................... *B25J 13/02* (2013.01)
(58) Field of Classification Search
CPC ........ B25J 13/02; B25J 9/1689; B25J 13/065; G05B 2219/35348; G05B 2219/37422;
(Continued)

(56) References Cited

U.S. PATENT DOCUMENTS

2007/0282485 A1    12/2007    Nagatsuka et al.
2016/0114418 A1    4/2016    Jones et al.

FOREIGN PATENT DOCUMENTS

| JP | 1-153288 A | 6/1989 |
| JP | 6-39753 A | 2/1994 |

(Continued)

OTHER PUBLICATIONS

Supplementary European Search Report mailed Jan. 4, 2024, in European Application No. 20898428.6, 12 pages.

(Continued)

*Primary Examiner* — Bhavesh V Amin
(74) *Attorney, Agent, or Firm* — XSENSUS LLP

(57) ABSTRACT

A robot system (100) of the present disclosure includes a robot (101) installed in a workarea (201), an interface (102), a display (105), and a control device (111). When operating the robot (101) to perform a kind of work defined beforehand to a workpiece (300) based on manipulational command information on the robot (101) inputted from the interface (102), the control device (111) displays on the display (105) a spatial relationship between the workpiece (300) and the robot (101) in a state where the workpiece and the robot are seen from a direction different from a direction in which an operator looks at the robot (101) from a manipulation area (202) that is a space different from the workarea (201), based on three-dimensional model information on the workpiece (300), three-dimensional model information on the robot (101), and the manipulational command information.

9 Claims, 13 Drawing Sheets

(58) Field of Classification Search
CPC ........ G05B 2219/40127; G05B 19/409; G05B 2219/40195
See application file for complete search history.

(56) References Cited

FOREIGN PATENT DOCUMENTS

| | | |
|---|---|---|
| JP | 7-49711 A | 2/1995 |
| JP | 7-213966 A | 8/1995 |
| JP | 2003-311661 A | 11/2003 |
| JP | 2007-320009 A | 12/2007 |
| JP | 2007-326160 A | 12/2007 |
| JP | 2019-814 A | 1/2019 |
| WO | 2017204826 A1 | 11/2017 |

OTHER PUBLICATIONS

Roberto Cipolla et al., Human-rebot interface by pointing with uncalibrated stereo vision, Image and Vision Computing, vol. 14, No. 3, Apr. 1, 1996, pp. 171-178.

ROBOT SYSTEM

CROSS-REFERENCE TO RELATED APPLICATIONS

This application is based on PCT filing PCT/JP2020/046295, filed on Dec. 11, 2020, and claims the benefit of priority to Japanese Patent Application No. 2019-225563 filed on Dec. 13, 2019 with in Japan Patent Office, each of which is incorporated as a part of this application by reference in the entirety.

TECHNICAL FIELD

The present disclosure relates to a robot system.

BACKGROUND ART

Remote control devices for remotely manipulating and controlling a robot in a work environment are known (for example, see Patent Document 1). The remote control device disclosed in Patent Document 1 includes a camera which captures an image of the work environment, an environment model storing means which stores information on the position and the posture of an object which is a target of the work by the robot in the work environment, as an environment model, and a synthesized image generating means which generates a synthesized image which is obtained by synthesizing the image captured by the camera, and an image which is displayed by diagrammatizing information on positioning obtained from the environment model storing means. When the robot is manually operated by a manipulating means, the synthesized image is displayed on a displaying means to guide the manual operation.

REFERENCE DOCUMENT(S) OF CONVENTIONAL ART

Patent Document

[Patent Document 1] JP2003-311661A

DESCRIPTION OF THE DISCLOSURE

Meanwhile, a painting robot for painting a workpiece is disposed in an explosion-proof area. Therefore, in order for a worker (operator) to remotely operate the painting robot by using the remote control device disclosed in Patent Document 1, it is necessary to dispose an explosion-proof camera in the explosion-proof area. The explosion-proof camera is high in cost, and therefore, the facility cost increases. When the size of the workpiece to be painted changes, it may be necessary to change the imaging location of the camera. In such a case, the worker's work load increases. Further, because of the injected paint, a tip-end part of the robot and the workpiece may become difficult to be seen from the camera. Also in this case, it is necessary to change the imaging location of the camera, and the worker's work load increases. Similarly, because of light which occurs by welding, and fluid which is injected (discharged) for washing or grinding, the tip-end part of the robot and the workpiece may become difficult to be seen from the camera. Also in this case, it is necessary to change the imaging location of the camera, and the worker's work load increases.

The present disclosure is to solve the problems described above, one purpose thereof is to provide a robot system capable of reducing the facility cost, and another purpose thereof is to provide a robot system capable of reducing the operator's burden and improving the work efficiency.

A robot system according to the present disclosure includes a robot installed inside a workarea, an interface, a display, and a control device. When operating the robot to perform a kind of work defined beforehand to a workpiece based on manipulational command information on the robot inputted from the interface, the control device displays on the display a spatial relationship between the workpiece and the robot in a state where the workpiece and the robot are seen from a direction different from a direction in which an operator looks at the robot from a manipulation area that is a space different from the workarea, based on three-dimensional model information on the workpiece, three-dimensional model information on the robot, and the manipulational command information.

According to this robot system, since the operator can remotely operate the robot without disposing a camera in the workarea, the facility cost can be reduced. Since the spatial relationship between the workpiece and a tip-end part of the robot is displayed on the display, the operator can be informed of the spatial relationship between the workpiece and the tip-end part of the robot. Therefore, the operator's burden can be reduced, and the work efficiency can be improved.

MODES FOR CARRYING OUT THE DISCLOSURE

Figure 1:
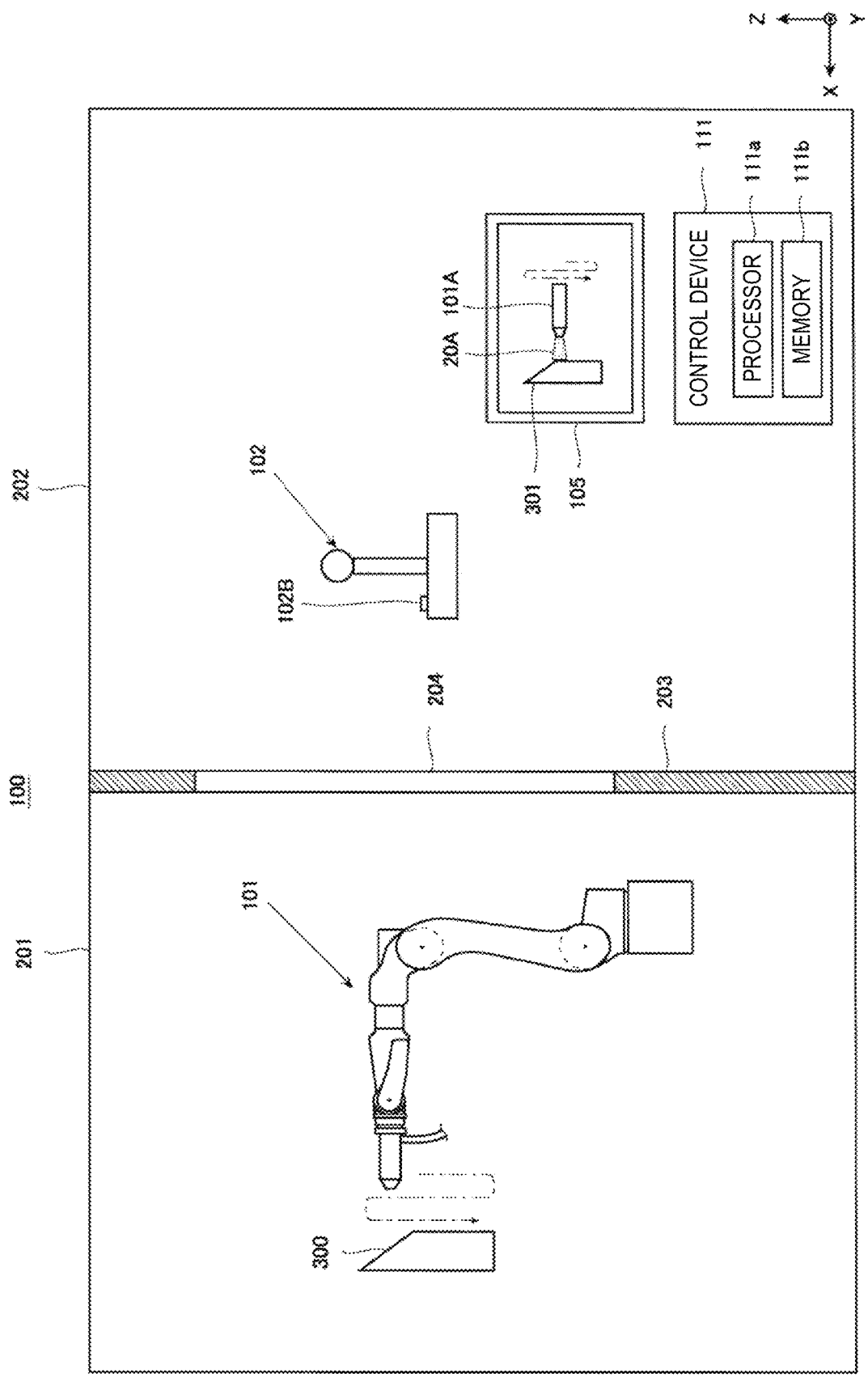
FIG. 1 is a schematic diagram illustrating an outline configuration of a robot system according to Embodiment 1.

Hereinafter, embodiments of the present disclosure will be described with reference to the drawings. Note that, throughout the drawings, the same reference characters are given to the same or corresponding parts to omit redundant explanations. Further, throughout the drawings, components for describing the present disclosure are selectively illustrated, and illustration about other components may be omitted. Moreover, the present disclosure is not limited to the following embodiments.

Embodiment 1

[Configuration of Robot System]

FIG. 1 is a schematic diagram illustrating an outline configuration of a robot system according to Embodiment 1. As illustrated in FIG. 1, the robot system 100 includes a robot 101, an interface 102, a display 105, and a control device 111.

The robot 101 performs to a workpiece 300 a kind of work which is defined beforehand. The "work defined beforehand" means a work of any of spraying or injecting grains, fluid, or gas to the surface of the workpiece 300, and welding, cutting, washing, and polishing the workpiece 300. The robot 101 is remotely controlled by an operator operating the interface 102, and performs the work described above. Note that the detailed configuration of the robot 101 will be described later.

The robot 101 is installed inside a workarea 201, and the interface 102, the display 105, and the control device 111 are disposed inside a manipulation area 202. The workarea 201 includes at least a space inside an operating range of the robot 101. The manipulation area 202 is a space different from the workarea 201. In this embodiment, a wall member 203 is provided between the workarea 201 and the manipulation area 202, and the workarea 201 and the manipulation area 202 are divided by the wall member 203. A window 204 comprised of a transparent member is provided to the wall member 203, and the operator can see the robot 101 inside the workarea 201, while the operator is located inside the manipulation area 202. Note that the workarea 201 may be an explosion-proof area to which an explosion-proof measure is applied, and the manipulation area 202 may be a non-explosion-proof area to which the explosion-proof measure is not applied. In FIG. 1, the coordinate system which defines the workarea 201 which is the space where the robot 101 is installed is illustrated as a three-dimensional rectangular coordinate system which is defined by the X-axis and the Y-axis which are perpendicular to each other on a horizontal plane, and the Z-axis of which the positive direction is upward in the vertical direction. Note that the positive direction along the X-axis is in agreement with a direction from the robot 101 toward the workpiece 300. The X-axis, the Y-axis, and the Z-axis are similar in FIG. 1 and the subsequent drawings.

The interface 102 operates the robot 101. The interface 102 is a joystick, a keyboard, ten keys, a teach pendant, etc., for example. In the interface 102, an apparatus which transmits to the operator inner force sense information detected by a force sensor provided to an end effector 20 of the robot 101, or voice information, may be disposed. The apparatus may be, for example, a vibration motor, a speaker, and a mechanism which expands and contracts a casing which constitutes a gripper. The interface 102 may be provided with a switch 102B which instructs start/stop of the work described above for the workpiece 300. The interface 102 may be a device which is portable by the operator.

The display 105 displays three-dimensional models of the workpiece 300 and the robot 101 etc. The three-dimensional models are outputted from the control device 111. The display 105 may be, for example, a non-portable display, or may be a head mounted display or glasses, which are used by the operator, while being worn by the operator.

Figure 2:
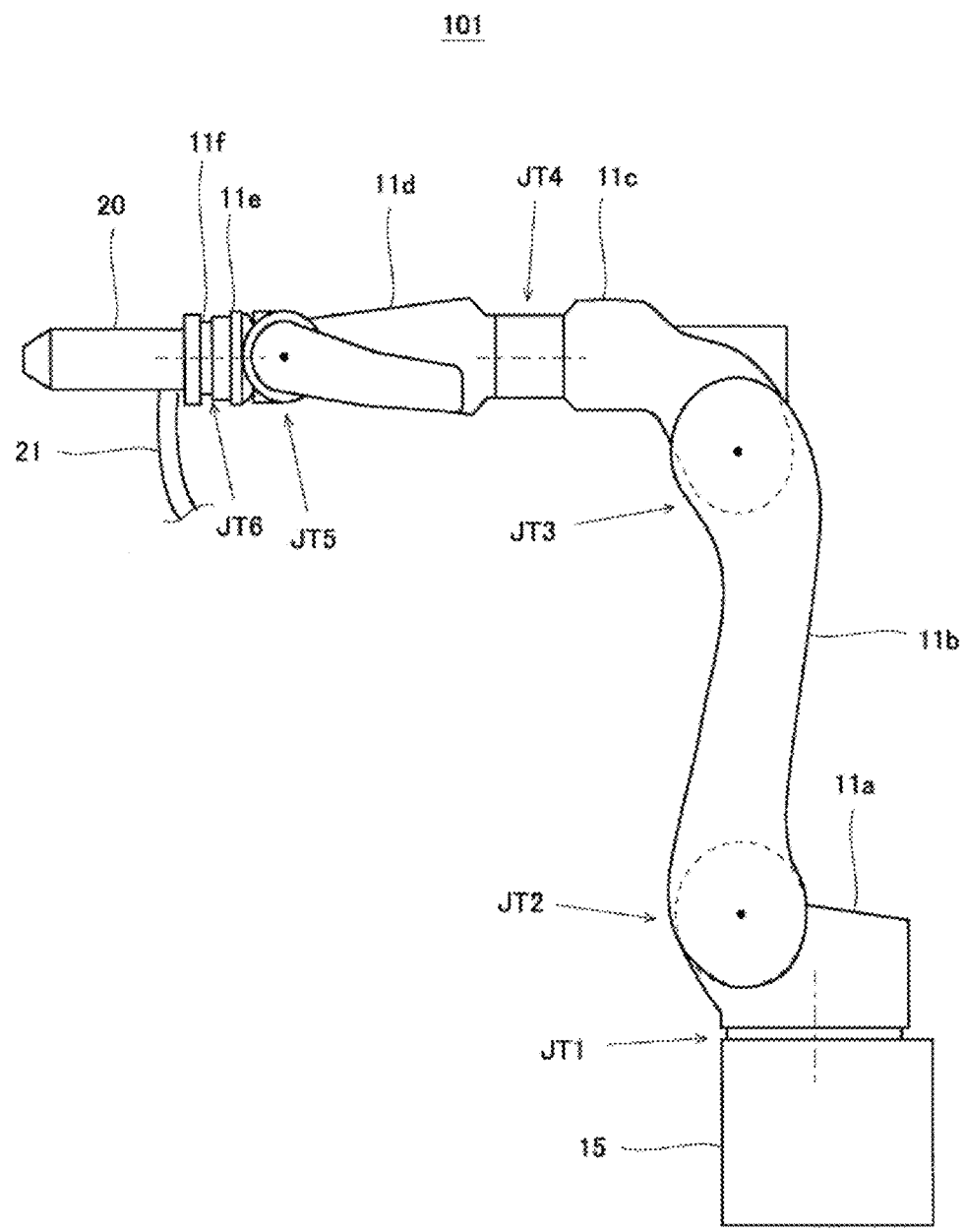
FIG. 2 is a schematic diagram illustrating an outline configuration of a robot.

FIG. 2 is a schematic diagram illustrating an outline configuration of the robot 101. As illustrated in FIG. 2, the robot 101 includes a serially-coupled body comprised of six links (a first link 11a, a second link 11b, a third link 11c, a fourth link 11d, a fifth link 11e, and a sixth link 110, six joints (a first joint JT1, a second joint JT2, a third joint JT3, a fourth joint JT4, a fifth joint JT5, and a sixth joint JT6), and a pedestal 15 which supports the serially-coupled body and the joints. The robot 101 is a vertical articulated robot. Note that the robot 101 may be a horizontal articulated robot, instead of the vertical articulated robot.

In the first joint JT1, the pedestal 15 and a base-end part of the first link 11a are coupled to each other swivelably on an axis extending in the vertical direction. In the second joint JT2, a tip-end part of the first link 11a and a base-end part of the second link 11b are coupled to each other pivotably on an axis extending in the horizontal direction. In the third joint JT3, a tip-end part of the second link 11b and a base-end part of the third link 11c are coupled to each other pivotably on an axis extending in the horizontal direction. In the fourth joint JT4, a tip-end part of the third link 11c and a base-end part of the fourth link 11d are coupled to each other rotatably on an axis extending in the longitudinal direction of the fourth link 11d. In the fifth joint JT5, a tip-end part of the fourth link 11d and a base-end part of the fifth link 11e are coupled to each other pivotably on an axis perpendicular to the longitudinal direction of the fourth link 11d. In the sixth joint JT6, a tip-end part of the fifth link 11e and a base-end part of the sixth link 11f are twistably coupled to each other. A mechanical interface is provided to a tip-end part of the sixth link 11f. The end effector 20 is detachably attached to the mechanical interface, corresponding to the contents of work.

The end effector 20 sprays or injects fluids, such as paint, onto the surface of the workpiece 300, for example. The end effector 20 is connected to piping 21 for supplying the fluid to the end effector 20. Instead of the application of the fluid to the workpiece 300, the end effector 20 may be configured to perform any work among welding, cutting, washing, and polishing of the workpiece 300.

The first joint JT1, the second joint JT2, the third joint JT3, the fourth joint JT4, the fifth joint JT5, and the sixth joint JT6 are each provided with a drive motor. The drive motor is an actuator which relatively rotates two members coupled via each of the joints JT1, JT2, JT3, JT4, JT5, and JT6. The drive motor may be a servomotor which is servo-controlled by the control device 111, for example. Further, the first joint JT1, the second joint JT2, the third joint JT3, the fourth joint JT4, the fifth joint JT5, and the sixth joint JT6 are each provided with a rotation sensor which detects a rotational position of the drive motor, and a current sensor which detects current for controlling the rotation of the drive motor. The rotation sensor may be an encoder, for example.

The control device 111 includes a processor 111a such as a microprocessor and a CPU, and a memory 111b such as a ROM and a RAM. The memory 111b stores information on a basic program, various fixed data, etc. The memory 111b may store three-dimensional model information on a scale indicative of a first range set beforehand. The three-dimensional model information on the scale may be, for example, information on a ruler for measuring a distance from a tip end of the robot 101, or information on a cone shape indicative of a range where grains, fluid, or gas is injected to the workpiece 300.

The processor 111a performs various kinds of operations of the robot 101 by reading and executing software, such as the basic program, stored in the memory 111b. The processor 111a outputs to the display 105 the three-dimensional model of the workpiece 300 and the three-dimensional model of the tip-end part of the robot 101 which are stored in the memory 111b. The display 105 described above displays the three-dimensional model of the workpiece 300 inputted from the processor 111a as a 3D workpiece 301, and displays the three-dimensional model of the tip-end part of the robot 101 as a 3D robot 101A.

The control device 111 causes the robot 101 to perform the injecting work which injects grains, fluid, or gas to the workpiece 300. In this embodiment, the "work" of the injecting work means a series of operations which the robot 101 performs to the workpiece 300, and the operation includes a plurality of operations. The work includes, for example, an operation in which the robot 101 approaches the workpiece 300, an operation in which the robot 101 starts the injection of the fluid etc. to the workpiece 300, an operation in which the robot 101 stops the injection of the fluid etc., and an operation in which the robot 101 separates from the workpiece 300. Note that the control device 111 may be comprised of a sole control device which carries out a centralized control, or may be comprised of a plurality of control devices which collaboratively carry out a distributed control. Further, the control device 111 may be comprised of a microcomputer, or may be comprised of an MPU, a PLC (Programmable Logic Controller), a logical circuit, etc.

[Operation and Effects of Robot System]

Figure 3:
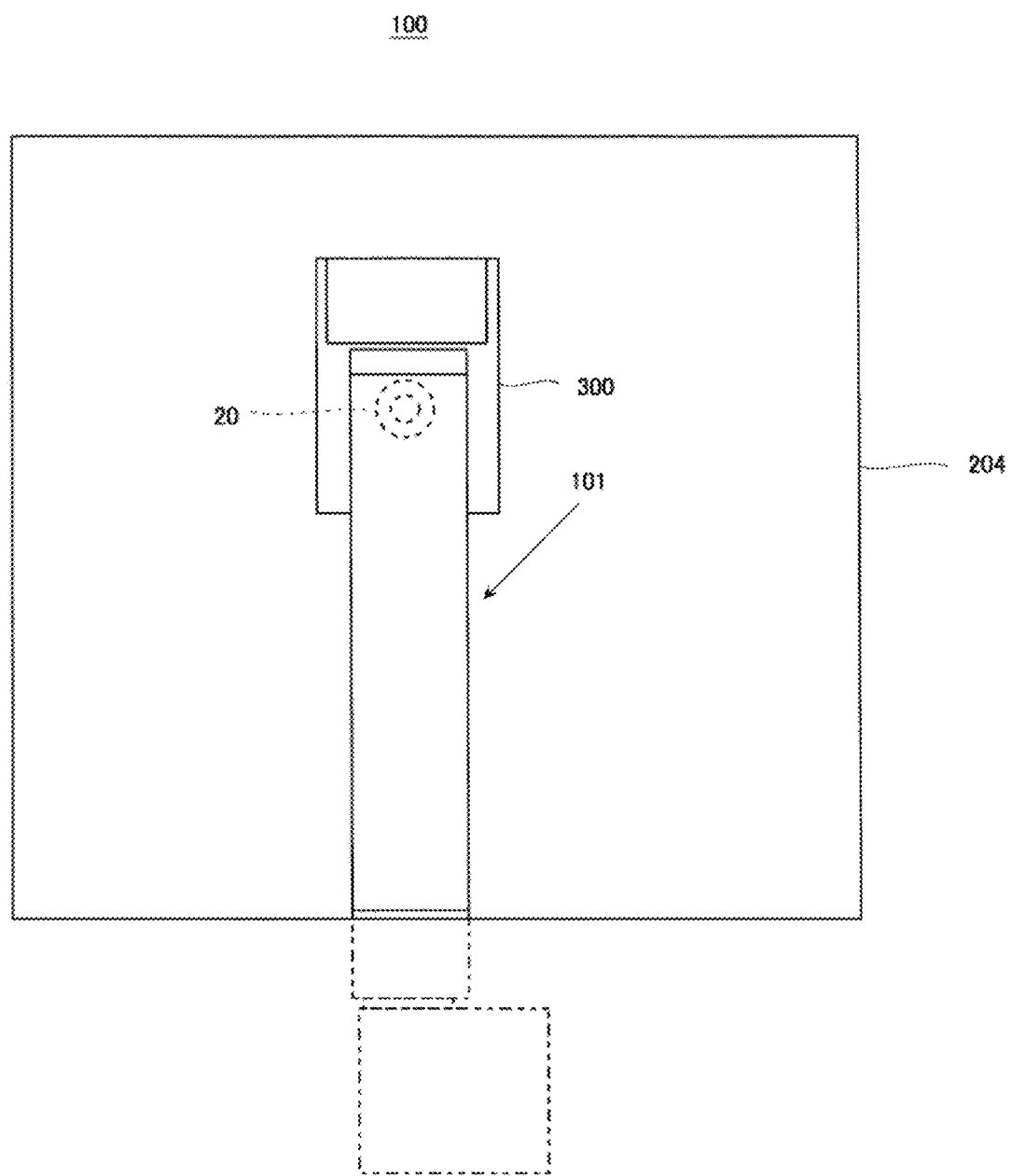
FIG. 3 is a schematic diagram illustrating a state of a workarea seen from a window.

FIG. 3 is a schematic diagram illustrating a state of the workarea 201 when seen from the window 204. As illustrated in FIG. 3, when the operator looks at the workarea 201 from the window 204, the workpiece 300 and the robot 101 may appear to be overlapped with each other. Further, a spatial relationship between a tip-end part of the end effector 20 of the robot 101 and the workpiece 300 may be difficult to be grasped. In such a case, it is possible to install a camera inside the workarea 201, to image the tip-end part of the end effector 20 of the robot 101 and the workpiece 300, and to present the operator the captured image.

However, when the robot 101 paints the workpiece 300, it is necessary to install an explosion-proof camera in the workarea 201. Since the explosion-proof camera is high in cost, the facility cost may increase. Further, since it is necessary to change the position of the camera according to the size and the kind of the workpiece to be painted, the worker's burden may increase. When the tip-end part of the end effector 20 of the robot 101 and the workpiece 300 are no longer included in an imaging area of the camera (for example, when the tip-end part of the end effector 20 and the workpiece 300 may become difficult to be seen from the camera because of the injected paint, light which occurs by welding, and fluid injected (discharged) for washing or grinding), since it is necessary to change the position of the camera, the worker's burden may increase. Therefore, the robot system 100 performs the following processing.

Figure 4:
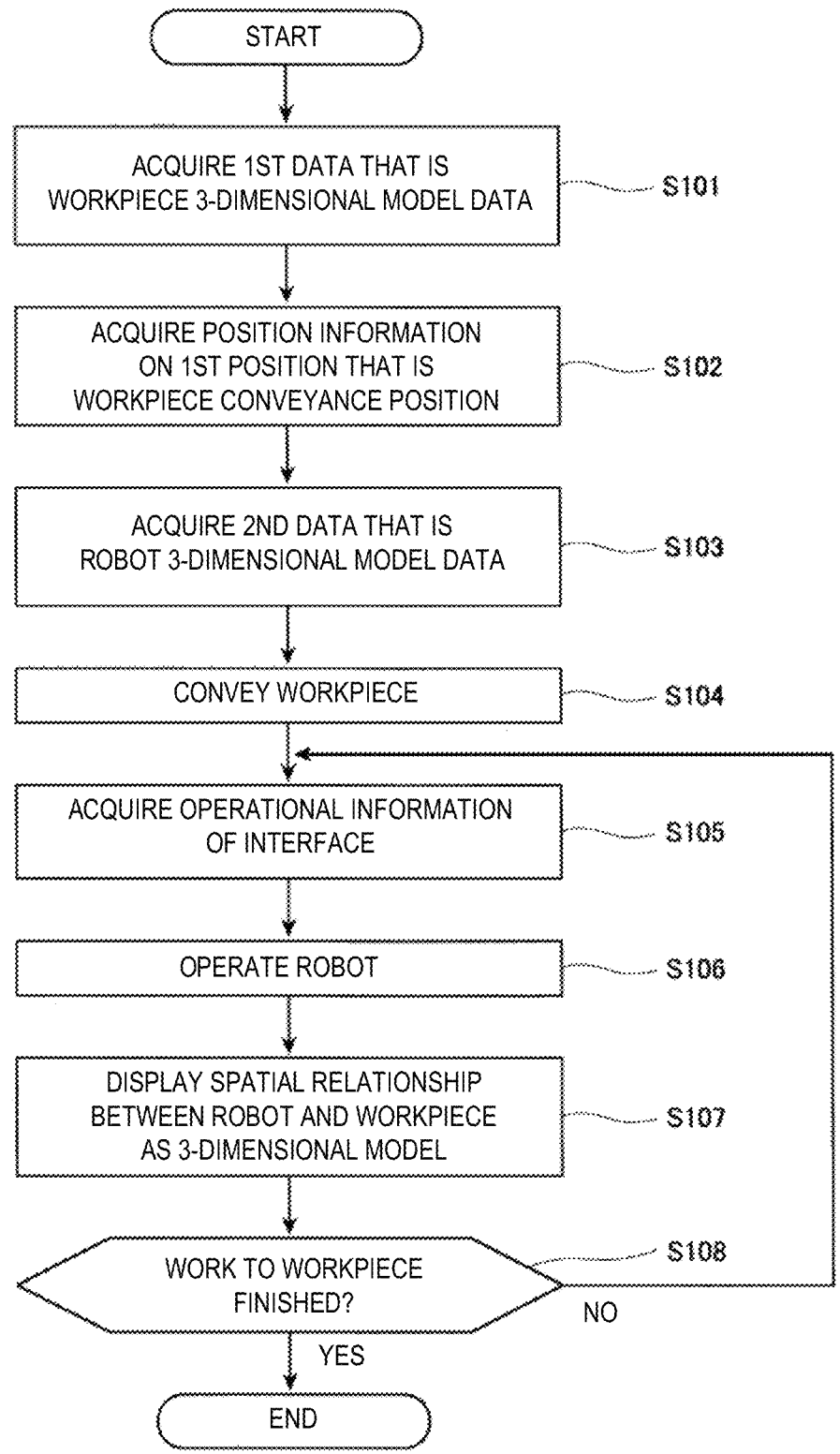
FIG. 4 is a flowchart illustrating one example of operation of the robot system according to Embodiment 1.

FIG. 4 is a flowchart illustrating one example of operation of the robot system 100 according to Embodiment 1. Processing illustrated in FIG. 4 is performed by the processor 111a of the control device 111 reading the program stored in the memory 111b. The processing illustrated in FIG. 4 is started when the operator instructs start of execution of the work for the workpiece 300 by using an input device etc., and instruction information indicative of the instruction is inputted into the control device 111. This embodiment will be described using an example of performing a painting work as the work.

The processor 111a acquires first data which is three-dimensional model data of the workpiece 300 (three-dimensional model information) from the memory 111b (Step S101). Note that the first data is created beforehand by a programmer and is stored in the memory 111b.

The processor 111a acquires, from the memory 111b, position information on a first position which is a conveyance position of the workpiece 300 inside the workarea 201 (Step S102). The first position is a position to which the workpiece 300 is conveyed by a conveying device (described later), and is a reference position for the robot 101 to perform the injecting work etc. to the workpiece 300.

The processor 111a acquires, from the memory 111b, second data which is three-dimensional model data of the robot 101 (three-dimensional model information) (Step S103). Note that the second data is created beforehand by the programmer and is stored in the memory 111b, similarly to the first data.

The processor 111a makes the conveying device, such as a belt conveyor, convey the workpiece 300 to the first position in the workarea 201 (Step S104). Note that the processor 111a may perform the processing of Steps S101 to S103 before the instruction information is inputted, or may perform the processing after execution of Step S104.

The processor 111a acquires manipulational command information inputted from the interface 102 (Step S105), and operates the robot 101 based on the manipulational command information acquired at Step S105 (Step S106).

The processor 111a displays on the display 105 the spatial relationship between the tip-end part of the end effector 20 of the robot 101 and the workpiece 300 based on the first data, the first position, and the second data which are acquired at Steps S101 to S103, and the manipulational command information acquired at Step S105, in the form of a three-dimensional model (Step S107). Note that, in the following explanation, the three-dimensional model of the robot 101 is referred to as the 3D robot 101A, and the three-dimensional model of the workpiece 300 is referred to as the 3D workpiece 301.

In detail, the processor 111a displays on the display 105 the 3D workpiece 301 and the 3D robot 101A in a state where they are seen from a direction different from a direction in which the operator looks at the robot 101 from the manipulation area 202. The "direction in which the operator looks at the robot 101 from the manipulation area 202" is a direction in which the operator looks at the robot 101 from the window 204 of the manipulation area 202 (in the example illustrated in FIG. 1, the direction from the negative side to the positive side along the X-axis), for example. Note that a motion sensor may be disposed in the manipulation area 202, and the direction in which the operator looks at the robot 101 from the manipulation area 202 may be a direction of a straight line which connects coordinates of the operator's position detected by the motion sensor and coordinates of the position of the robot 101. Further, in Embodiment 1, the "direction different from the direction in which the operator looks at the robot 101 from the manipulation area 202" may be any other direction, as long as it is a direction other than the direction from the negative side to the positive side along the X-axis, and, for example, it may be a direction perpendicular to the X-direction (the Y-direction or the Z-direction). Therefore, at Step S107, the processor 111a displays on the display 105 the 3D workpiece 301 and the 3D robot 101A which are seen when the robot 101 is seen from a direction different from the direction from the negative side to the positive side along the X-axis. In detail, as illustrated in FIG. 1, the processor 111a displays on the display 105 the spatial relationship between the tip-end part of the end effector 20 of the robot 101 and the workpiece 300 as seen from the Y-direction. Note that, as illustrated in FIG. 1, the processor 111a may display on the display 105 a 3D scale 20A which is a three-dimensional model of a scale at a tip end of the 3D robot 101A.

The processor 111a determines whether the instruction information indicative of an end of the work for the workpiece 300 is inputted via the input device etc. by the operator (Step S108).

If determined that the instruction information indicative of the end of the work is not inputted (Step S108: No), the processor 111a repeatedly performs the processing of Steps S105 to S108 until it determines that the instruction information indicative of the end of the work for the workpiece 300 is inputted. On the other hand, if determined that the instruction information indicative of the end of the work for the workpiece 300 is inputted (Step S108: Yes), the processor 111a ends this program.

Note that the processor 111a may store in the memory 111b operational information on the interface 102 which is information indicative of the work performed by the robot 101 when the operator operates the interface 102. Further, the processor 111a may operate the robot 101 according to the operational information stored in the memory 111b.

In the robot system 100 according to Embodiment 1 described above, the control device 111 displays on the display 105, as the three-dimensional model, the spatial relationship between the tip-end part of the end effector 20 of the robot 101 and the workpiece 300 as seen from the direction different from the direction in which the operator looks at the robot 101 from the window 204 of the manipulation area 202 (here, the direction from the negative side to the positive side along the X-axis). Therefore, since the operator can remotely operate the robot 101, without disposing the expensive explosion-proof camera in the workarea 201, the facility cost can be reduced. Further, since the operator need not change the position of the camera depending on the change of the kind and the size of the workpiece 300, the operator's burden can be reduced. Therefore, it can improve the operator's work efficiency.

In the robot system 100 according to Embodiment 1, since the control device 111 displays on the display 105 the spatial relationship between the workpiece 300 and the tip-end part of the robot 101, as the 3D workpiece 301 and the 3D robot 101A, respectively, the operator's burden can be reduced, and the work efficiency can be improved.

In the robot system 100 according to Embodiment 1, since the control device 111 displays on the display 105 the 3D scale 20A at the tip end of the end effector 20 of the robot 101 (3D robot 101A), the operator's burden can be reduced, and the work efficiency can be improved.

Note that, although in the robot system 100 described above the control device 111 displays on the display 105 the three-dimensional model of the tip-end part of the robot 101 as the 3D robot 101A, the present disclosure is not limited to this configuration. For example, the control device 111 may display, as the 3D robot 101A, a three-dimensional model of not only the tip-end part of the robot 101 but also other parts (for example, a rear-end part of the robot 101, and the entire robot 101).

[Modification 1]

Figure 5:
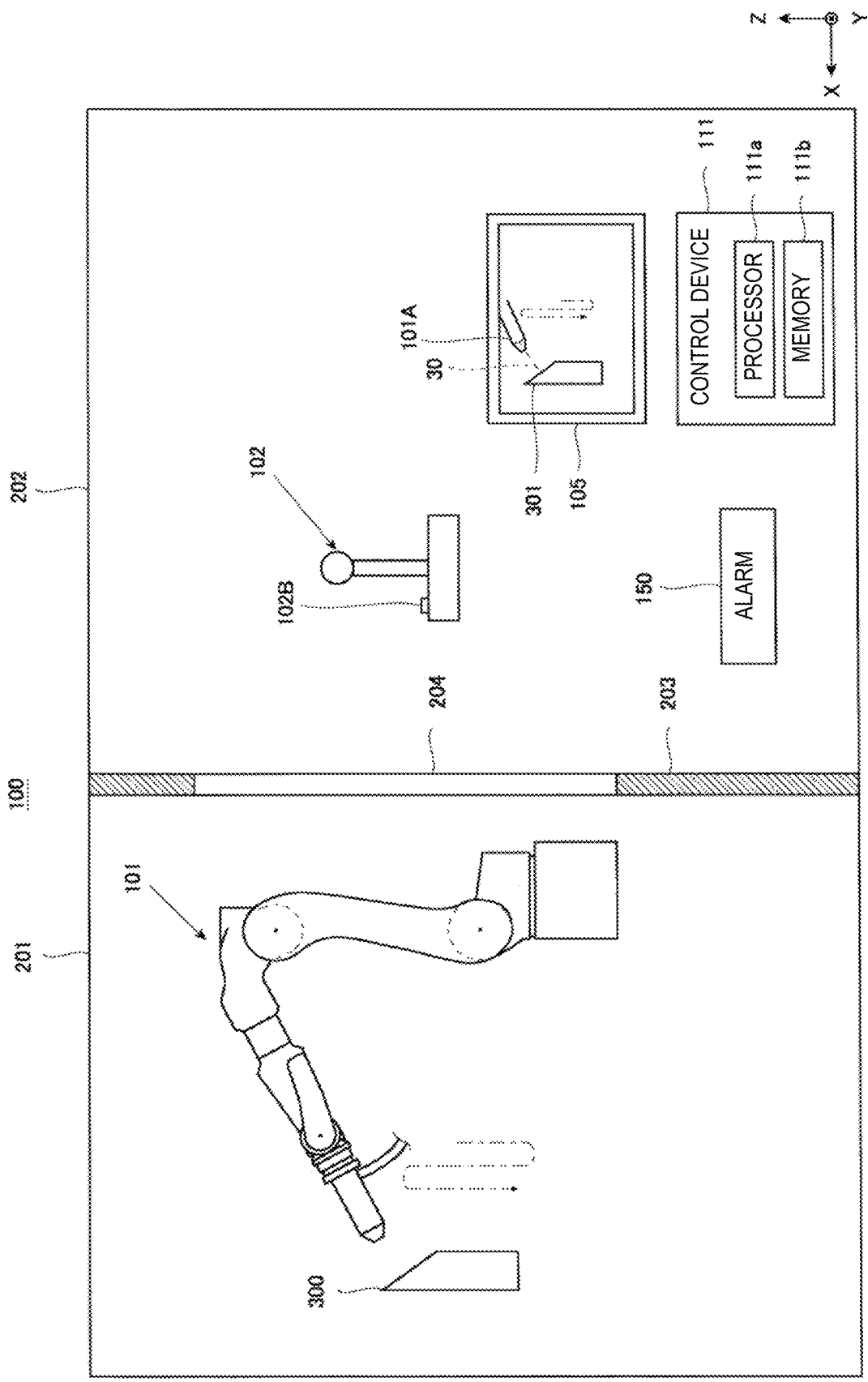
FIG. 5 is a schematic diagram illustrating an outline configuration of a robot system of Modification 1 in Embodiment 1.
Figure 6:
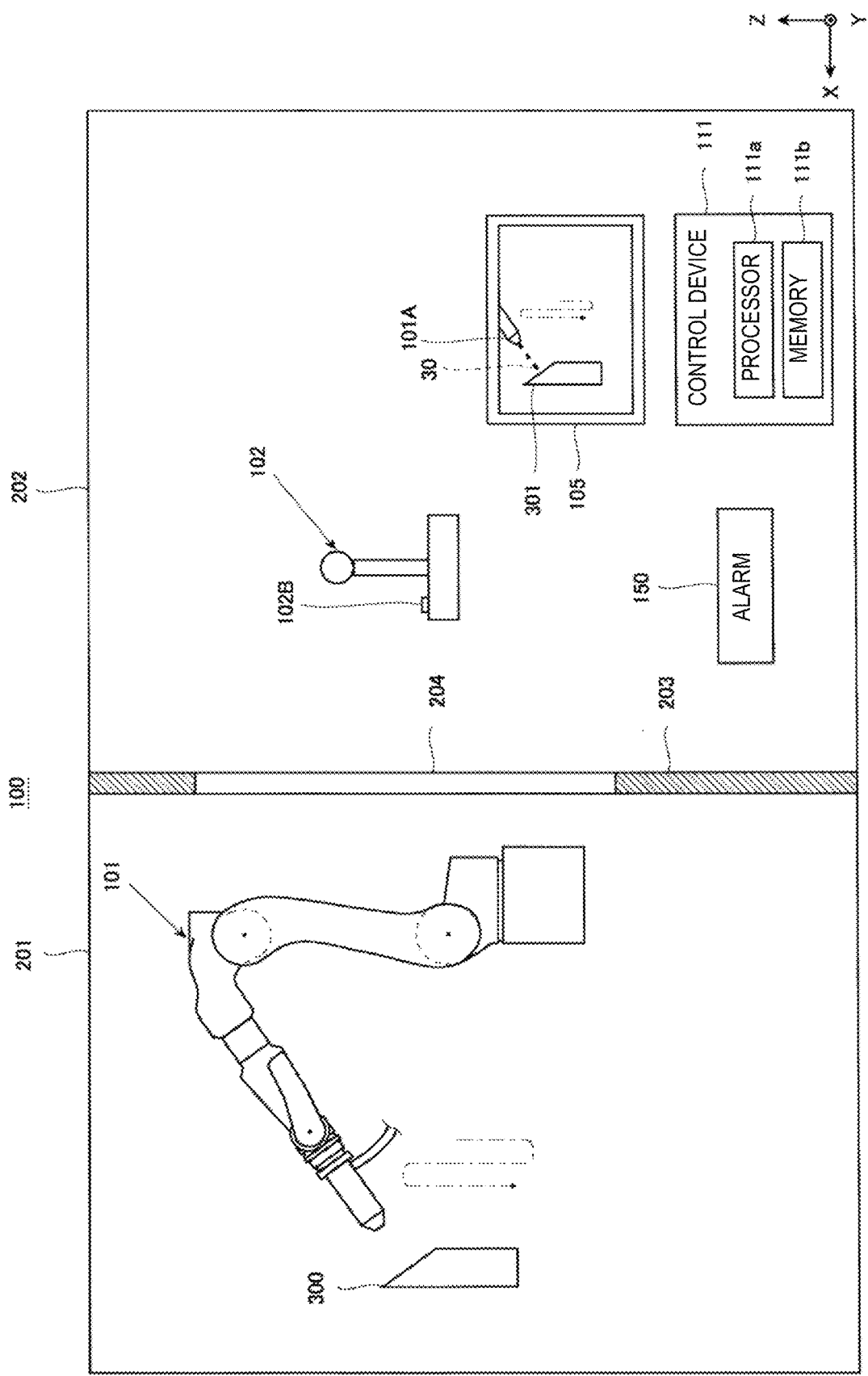
FIG. 6 is a schematic diagram illustrating the outline configuration of the robot system of Modification 1 in Embodiment 1.

FIGS. 5 and 6 are schematic diagrams illustrating an outline configuration of a robot system of Modification 1 in Embodiment 1. As illustrated in FIGS. 5 and 6, the robot system 100 of Modification 1 differs from the robot system 100 of Embodiment 1 described above in that a line 30 indicative of a normal direction to a first part set beforehand in the workpiece 300 is displayed on the display 105 based on the three-dimensional model information on the workpiece 300, and an alarm 150 is additionally provided.

The "first part" described above is a part which opposes to the tip end of the end effector 20 of the robot 101. The alarm 150 informs information which urges a caution to the operator. In Modification 1, the alarm 150 informs that the line 30 becomes in agreement with the axial center direction of the end effector 20 in the 3D robot 101A. The informing method may be displaying character data or image data on the display 105, or may be outputting sound from a speaker etc., or may be lighting up a lamp, or may be changing the color of light according to the contents of information. Moreover, it may be informed by an e-mail or an application to other terminal devices (e.g., a smartphone, a cellular phone, or a tablet computer) connected to the control device 111 wirelessly or wiredly.

As illustrated in FIG. 6, when the line 30 becomes in agreement with the axial center direction of the end effector 20 in the 3D robot 101A, the control device 111 changes the thickness of the line 30, and displays it on the display 105. Note that, instead of the thickness of the line 30, the control device 111 may change the color of the line 30 and display it, or may change both the thickness and the color of the line 30 and display it.

The robot system 100 of Modification 1 described above has similar operation and effects to the robot system 100 according to Embodiment 1 described above.

Embodiment 2

[Configuration of Robot System]

Figure 7:
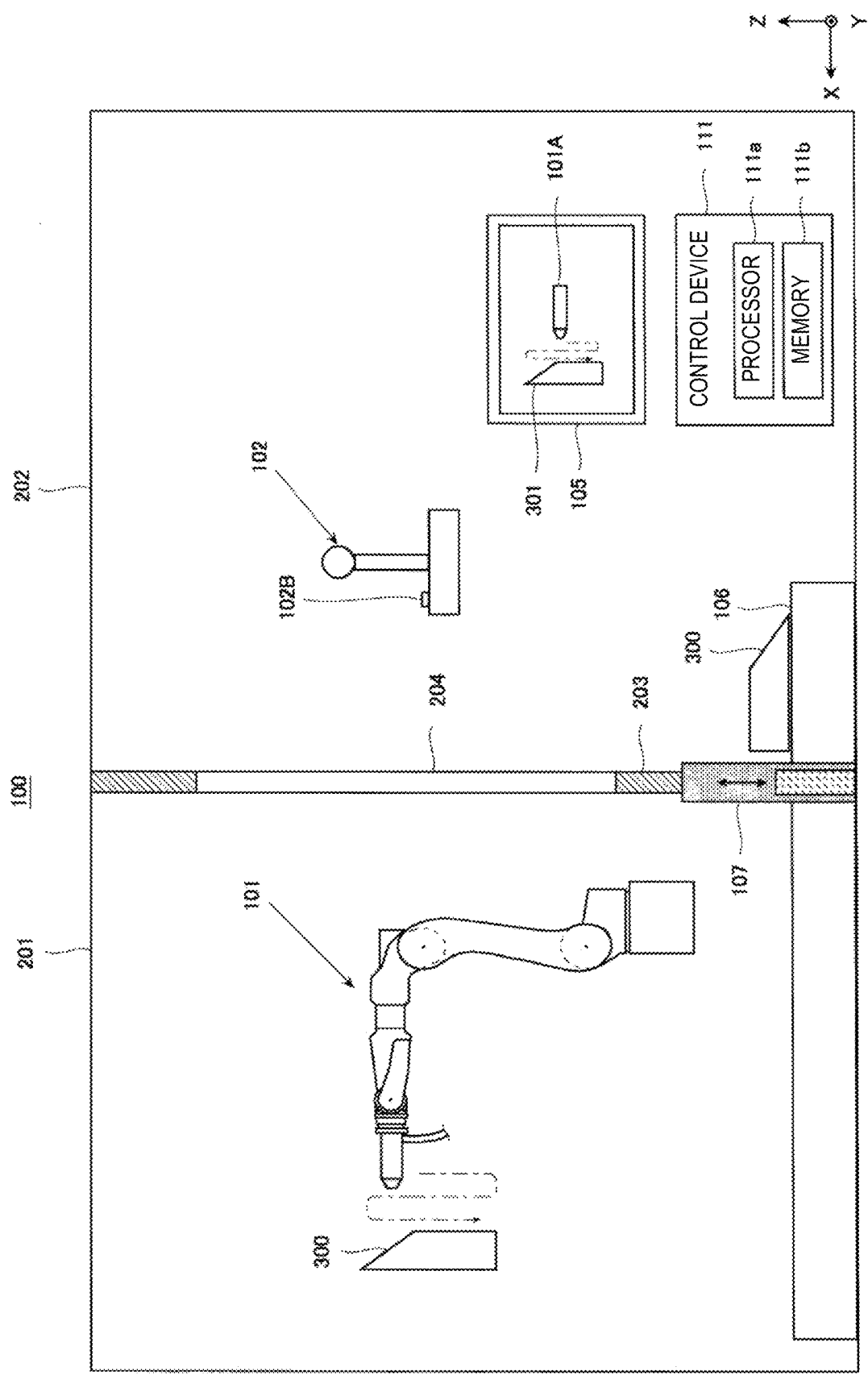
FIG. 7 is a schematic diagram illustrating an outline configuration of a robot system according to Embodiment 2.

FIG. 7 is a schematic diagram illustrating an outline configuration of a robot system according to Embodiment 2. As illustrated in FIG. 7, the robot system 100 according to Embodiment 2 differs from the robot system 100 according to Embodiment 1 in that a conveying device 106 which conveys the workpiece 300 from the manipulation area 202 to the workarea 201 is additionally provided, and a shutter 107 which limits movement of the workpiece 300 in the conveying device 106 is additionally provided. The conveying device 106 may be a known conveying device, such as a belt conveyor. The shutter 107 is attached to the wall member 203, and permits or inhibits the movement of the workpiece 300 from the manipulation area 202 to the workarea 201. Note that the shutter 107 may be omitted.

The robot system 100 according to Embodiment 2 described above has similar operation and effects to the robot system 100 according to Embodiment 1 described above.

Embodiment 3

[Configuration of Robot System]

Figure 8:
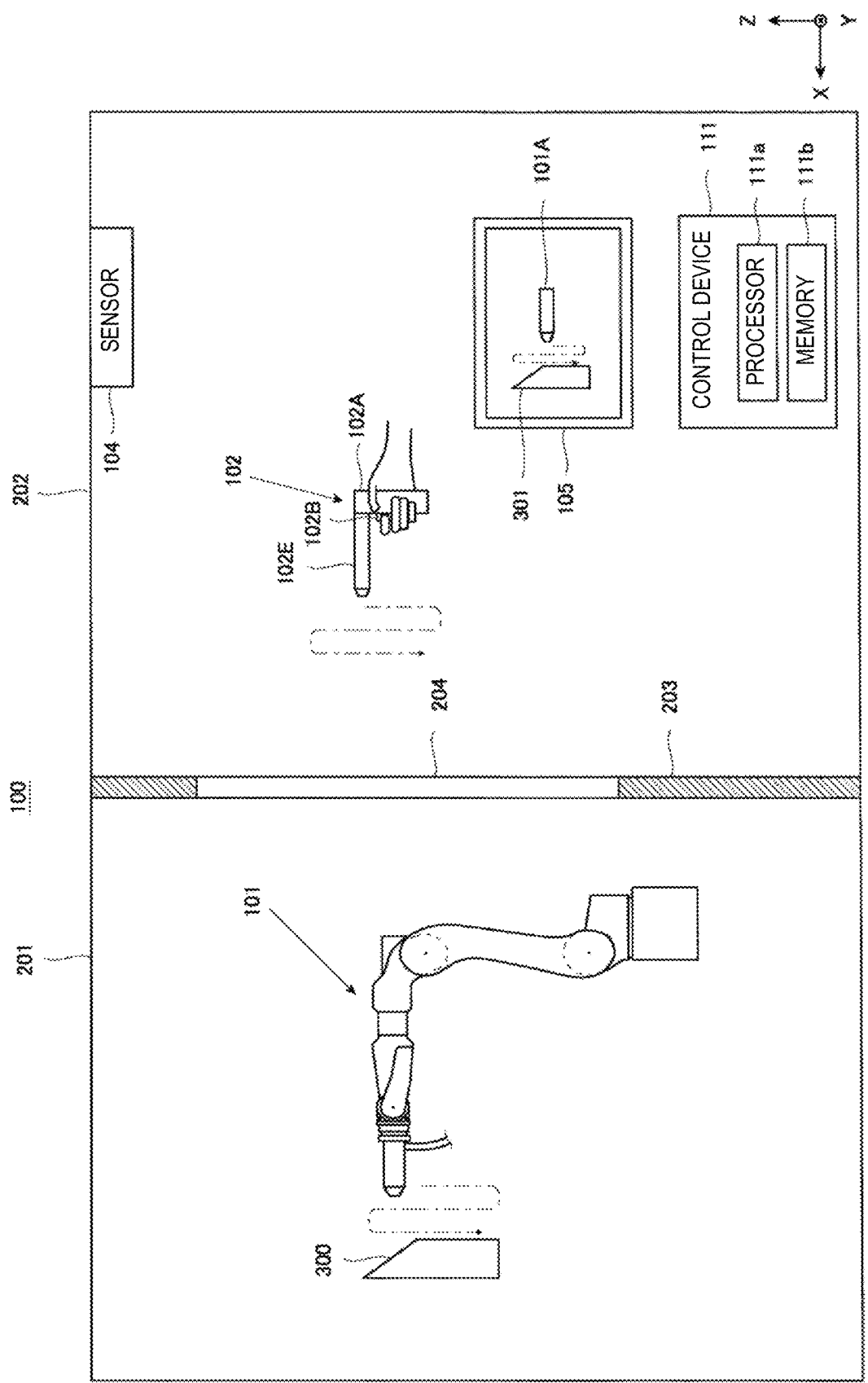
FIG. 8 is a schematic diagram illustrating an outline configuration of a robot system according to Embodiment 3.

FIG. 8 is a schematic diagram illustrating an outline configuration of a robot system according to Embodiment 3. As illustrated in FIG. 8, the robot system 100 according to Embodiment 3 differs from the robot system 100 according to Embodiment 1 in that a sensor 104 is disposed in the manipulation area 202, and the interface 102 is provided with a gripper 102A and an interface body 102E.

The sensor 104 wirelessly detects position information and posture information on a tip-end part of the interface 102, and outputs them to the control device 111. The output of the position information and the posture information to the control device 111 is performed through wireless or wired communications. The sensor 104 is an infrared sensor, for example. Note that the sensor 104 may be a camera, instead of the infrared sensor. In this case, the sensor 104 may not be disposed inside the manipulation area 202, and, for example, it may be a camera provided to a personal digital assistant or a head mounted display which the operator carries.

The interface 102 is provided with the gripper 102A and the interface body 102E. The operator manipulates the robot 101 by gripping the gripper 102A and operating the interface body 102E. In detail, by operating the robot 101 so as to follow the locus of the tip-end part of the interface body 102E, the operator can manipulate the robot 101 intuitively using the interface 102 inside the manipulation area 202.

In the gripper 102A, an apparatus which transmits, to the operator, inner force sense information or voice information detected by a force sensor provided to the end effector 20 of the robot 101 may be disposed. The apparatus may be, for example, a vibration motor, a speaker, and a mechanism which expands and contracts a casing which constitutes the gripper. Note that the interface body 102E of the interface 102 may be formed in a similar shape to the end effector 20 of the robot 101.

The control device 111 calculates the locus of the interface 102 based on the position information and the posture information on the interface 102 which are inputted from the sensor 104, and operates the end effector 20 of the robot 101 on real time so that the end effector 20 follows the movement of the tip-end part of the interface 102.

[Operation and Effects of Robot System]

Figure 9:
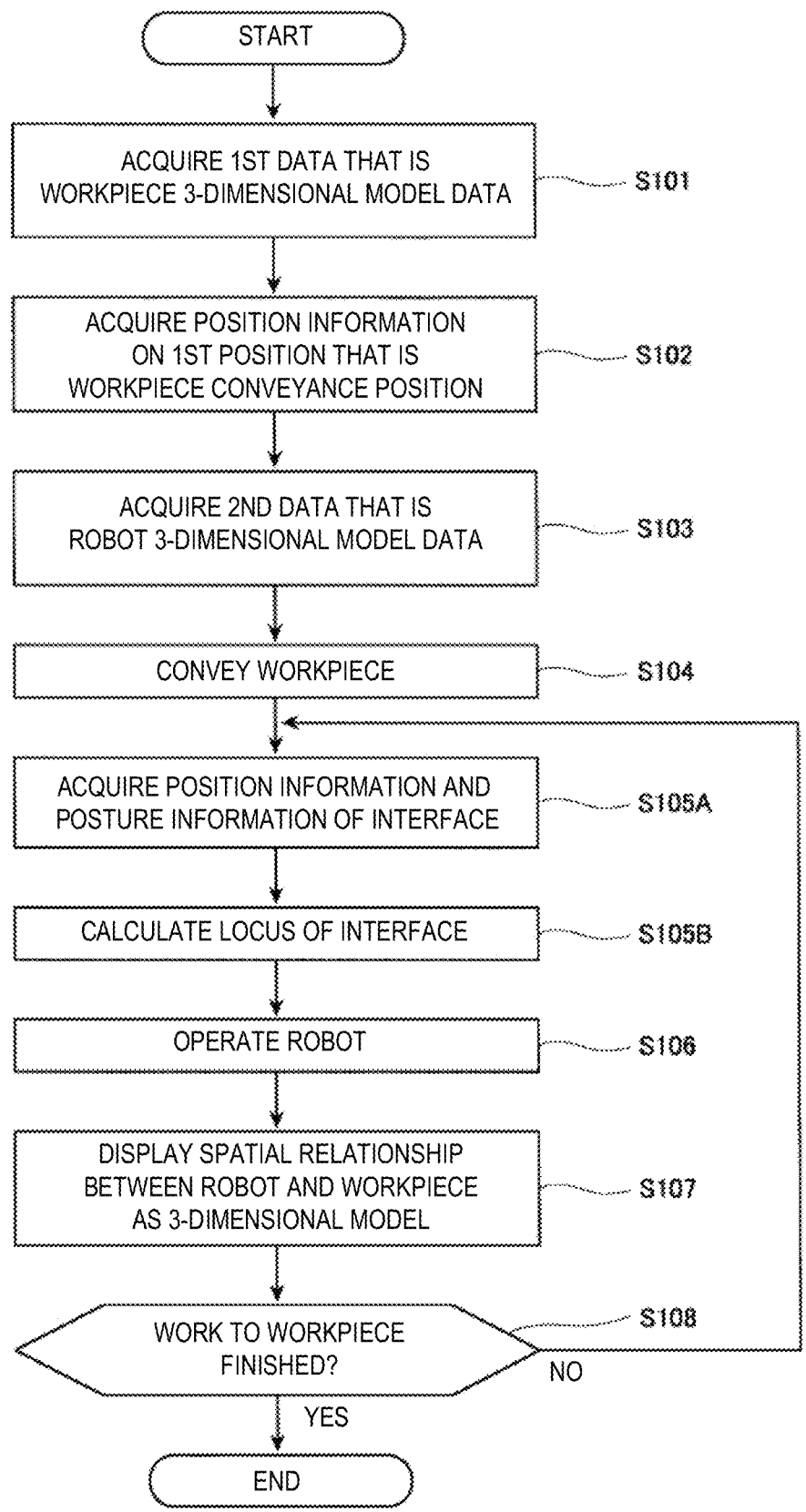
FIG. 9 is a flowchart illustrating one example of operation of the robot system according to Embodiment 3.

FIG. 9 is a flowchart illustrating one example of operation of the robot system according to Embodiment 3. As illustrated in FIG. 9, the operation of the robot system 100 according to Embodiment 3 differs from the operation of the robot system 100 according to Embodiment 1 in that Steps S105A and S105B are performed, instead of Step S105.

In detail, the processor 111a acquires, from the sensor 104, the position information and the posture information on the interface 102 which are detected by the sensor 104 (Step S105A). The processor 111a calculates the locus of the interface 102 based on the position information and the posture information which are acquired at Step S105A (Step S105B). Note that the calculated locus corresponds to manipulational command information.

The processor 111a operates the robot 101 on real time based on the locus of the interface 102 calculated at Step S105B (Step S106). Step S107 described above is performed after execution of Step S106, where the spatial relationship between the tip-end part of the end effector 20 of the robot 101 and the workpiece 300 is displayed on the display 105 as the three-dimensional model.

The robot system 100 according to Embodiment 3 described above has similar operation and effects to the robot system 100 according to Embodiment 1 described above.

Note that the processor 111a may store in the memory 111b locus information on the interface 102 which is information indicative of the work performed by the robot 101 based on the locus of the interface 102 which is produced by the operator operating the interface 102. Further, the processor 111a may operate the robot 101 according to the locus information stored in the memory 111b.

[Modification 1]

Figure 10:
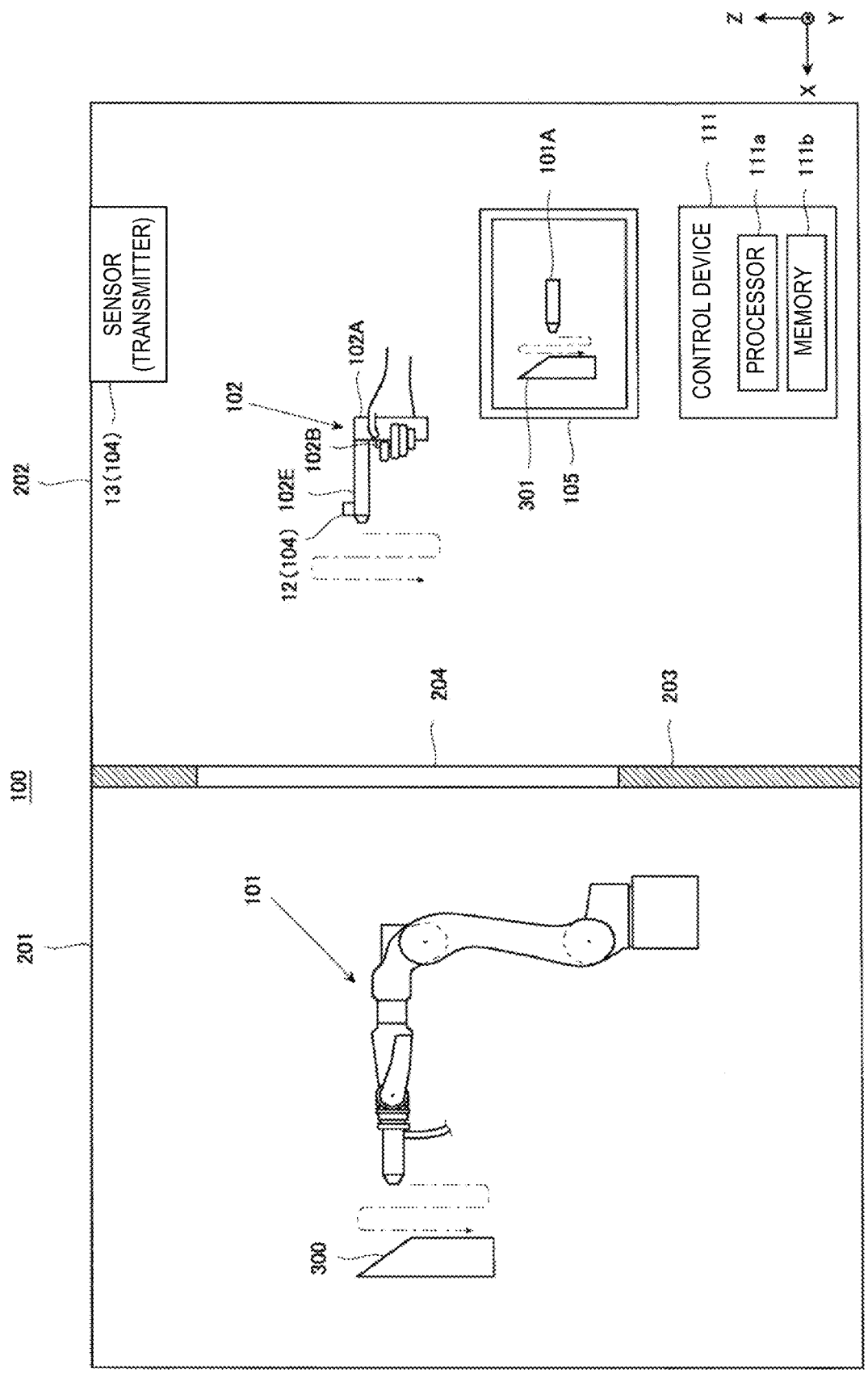
FIG. 10 is a schematic diagram illustrating an outline configuration of a robot system of Modification 1 in Embodiment 3.

FIG. 10 is a schematic diagram illustrating an outline configuration of a robot system of Modification 1 in Embodiment 3. As illustrated in FIG. 10, the robot system 100 of Modification 1 differs from the robot system 100 according to Embodiment 3 in that a detector 12 which wirelessly detects the position information and the posture information on the interface 102 is provided, and a transmitter 13 which transmits to the control device 111 the position information and the posture information which are detected by the detector 12 is provided. Note that, in Modification 1, the detector 12 and the transmitter 13 correspond to the sensor 104.

The detector 12 is provided to the interface 102. The detector 12 is a gyro sensor, for example. Note that the detector 12 may be a camera, instead of the gyro sensor. Further, for example, the detector 12 may not detect both the position information and the posture information, or may detect only the position information, or may detect only the posture information.

The robot system 100 of Modification 1 described above has similar operation and effects to the robot system 100 according to Embodiment 3 described above.

Embodiment 4

[Configuration of Robot System]

Figure 11:
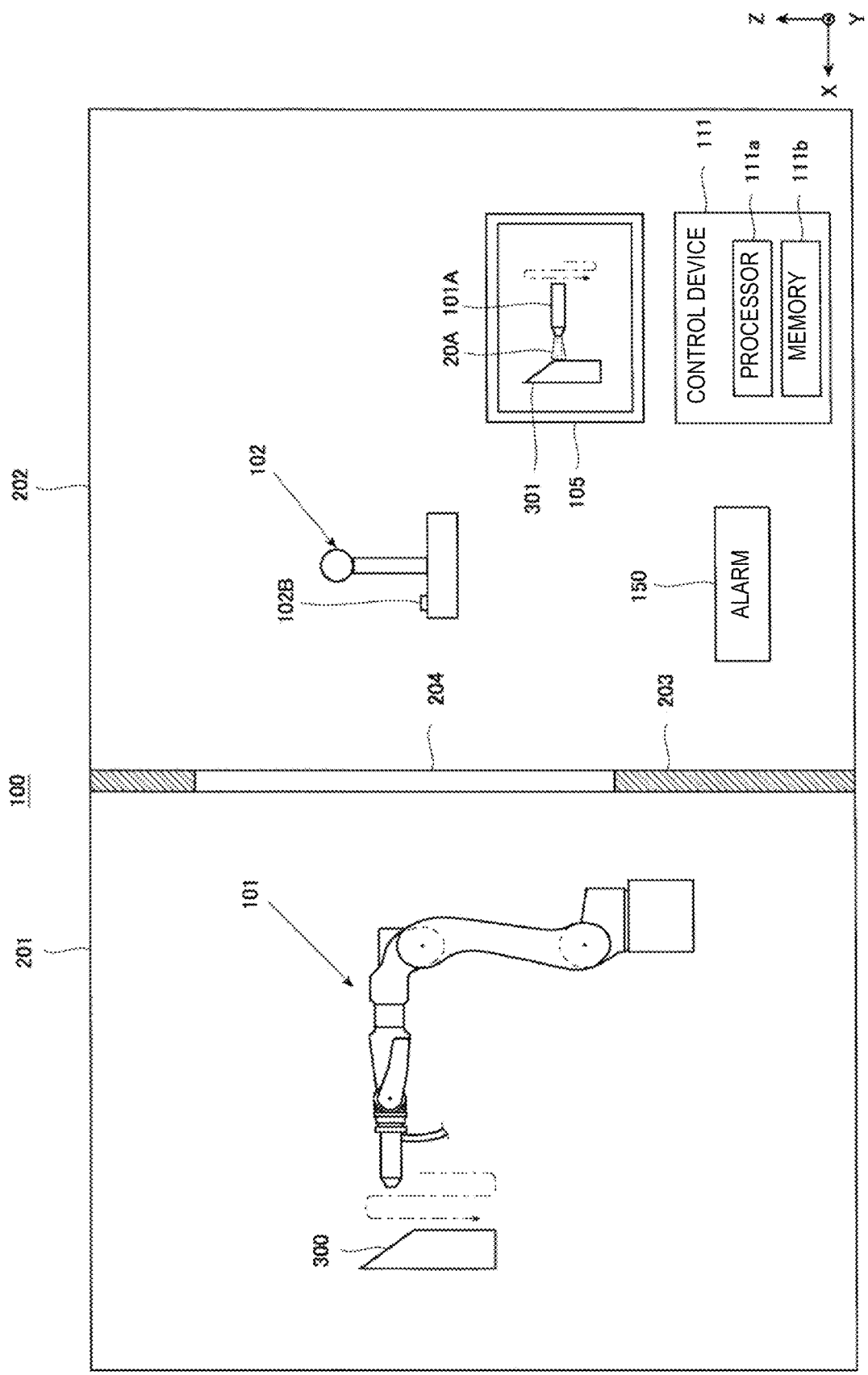
FIG. 11 is a schematic diagram illustrating an outline configuration of a robot system according to Embodiment 4.

FIG. 11 is a schematic diagram illustrating an outline configuration of a robot system according to Embodiment 4. As illustrated in FIG. 11, the robot system 100 according to Embodiment 4 differs from the robot system 100 according to Embodiment 1 in that the alarm 150 is disposed inside the manipulation area 202. Since the alarm 150 is the same as the alarm 150 of Modification 1 in Embodiment 1, detailed explanation thereof is omitted.

[Operation and Effects of Robot System]

Figure 12A:
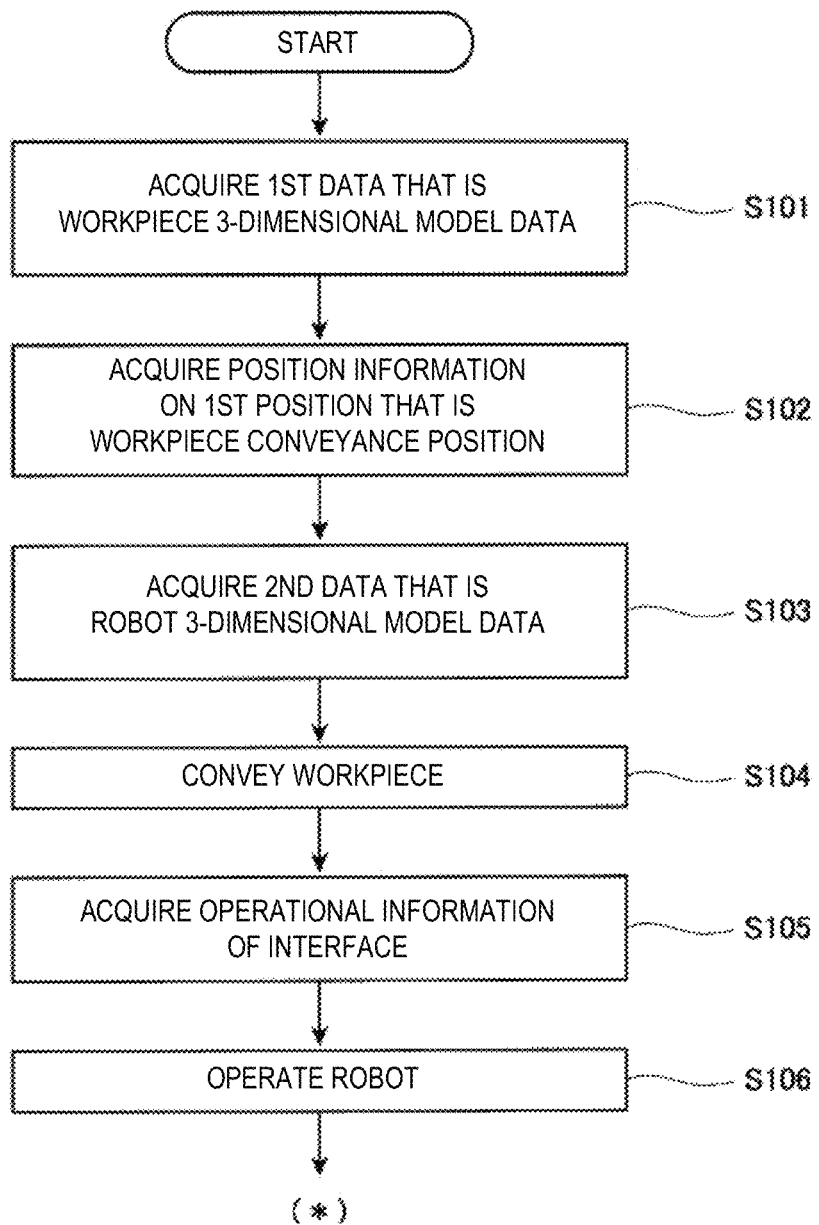
FIG. 12A is a flowchart illustrating one example of operation of the robot system according to Embodiment 4.
Figure 12B:
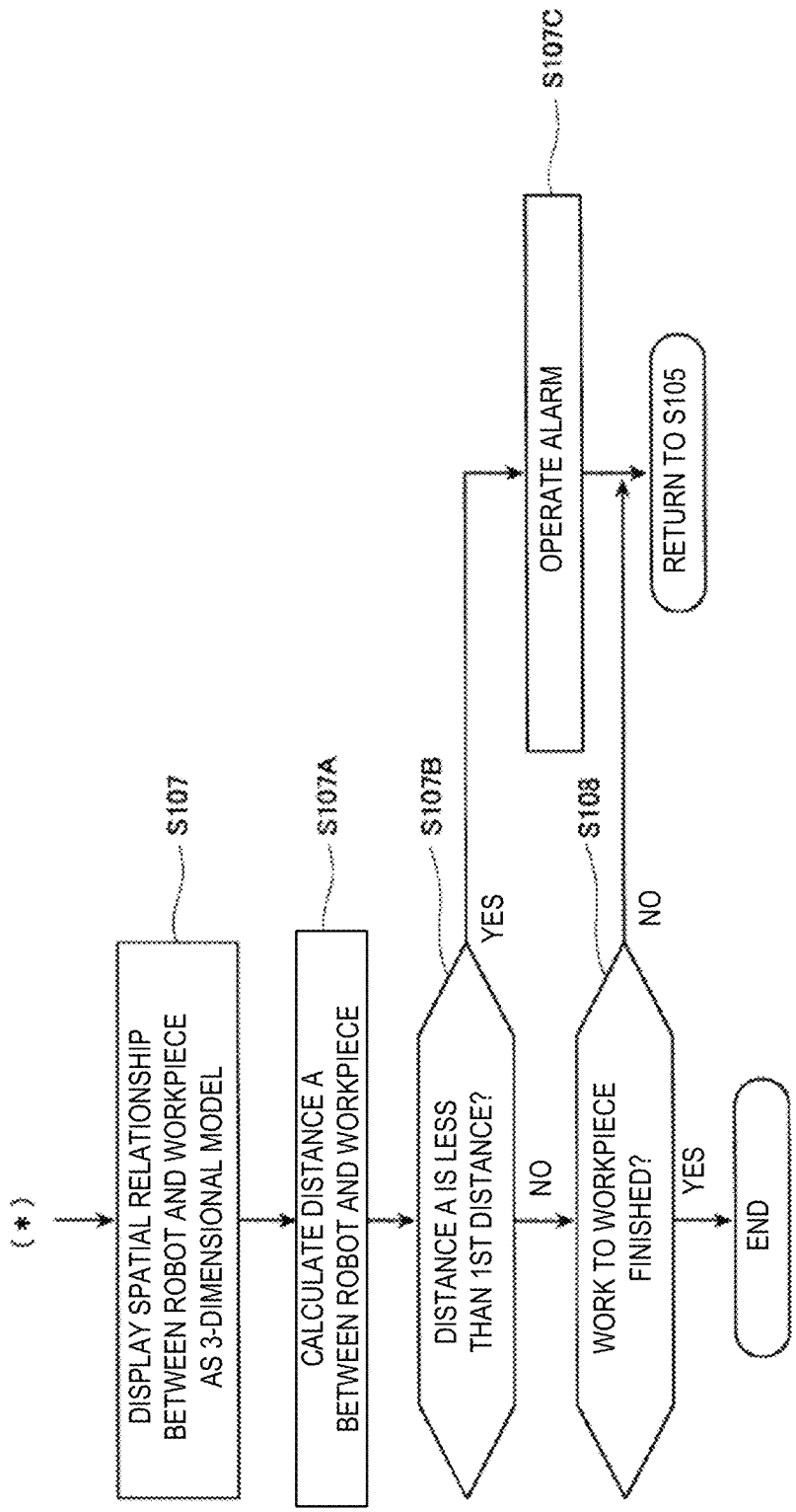
FIG. 12B is a flowchart illustrating one example of the operation of the robot system according to Embodiment 4.

FIGS. 12A and 12B are flowcharts illustrating one example of operation of the robot system according to Embodiment 4. As illustrated in FIGS. 12A and 12B, operation of the robot system 100 according to Embodiment 4 differs from the operation of the robot system 100 according to Embodiment 1 in that processing of Steps S107A and S107B and Step S107C is performed between Steps S107 and S108.

In detail, when Step S107 described above is performed, and the spatial relationship between the tip-end part of the end effector 20 of the robot 101 and the workpiece 300 is displayed on the display 105 as the three-dimensional model based on the first data, the second data, and the manipulational command information, the processor 111a calculates a distance A between the robot 101 and the workpiece 300 based on the first data, the second data, and the manipulational command information (Step S107A). Here, the processor 111a may calculate the shortest distance between the robot 101 and the workpiece 300 as the distance A. For example, the shortest distance may be a distance between a part of the robot 101 nearest to the workpiece 300, and the workpiece 300. That is, when the tip end of the end effector 20 of the robot 101 is located at the position nearest to the workpiece 300, the processor 111a may calculate the distance between the tip end of the end effector 20 and the workpiece 300. Further, when a certain part of the robot 101 is located at the position nearest to the workpiece 300, the processor 111a may calculate a distance between this part and the workpiece 300. Since the distance A is calculated based on the first data, the second data, and the manipulational command information, 3D data may also be used, and, in this case, a distance between the 3D robot 101A and the 3D workpiece 301 may be calculated.

The processor 111a determines whether the distance A calculated at Step S107A is less than a first distance set beforehand (Step S107B). In this embodiment, the first distance is set as a value according to the operating speed of the robot 101, the contents of the work for the workpiece 300, etc. For example, in terms of suppressing a collision of the robot 101 with the workpiece 300, the first distance is preferably 0.5 cm or more. Further, for example, when the operating speed of the robot 101 is slower, the first distance may be set smaller compared with the case where the operating speed of the robot 101 is faster. For example, in terms of performing the work to the workpiece 300, the first distance may be 30 cm. Moreover, for example, when the contents of the work for the workpiece 300 are welding, cutting, washing, and polishing work, the first distance is set smaller, compared with the case where the contents of the work for the workpiece 300 are the injecting/spraying work of fluid.

If determined that the distance A is less than the first distance (Step S107B: Yes), the processor 111a causes the alarm 150 to inform a warning indicating that the robot 101 may collide the workpiece 300 (Step S107C). Here, the processor 111a may reduce the operating speed of the robot 101, or may stop the robot 101. Therefore, since the operator can be informed of that the robot 101 may collide the workpiece 300, the operator can manipulate the robot 101 by using the interface 102 so that the collision of the robot 101 with the workpiece 300 is avoided. Step S105 described above is performed after execution of Step S107C.

On the other hand, if determined that the distance A is not less than the first distance (Step S107B: No), the processor 111a performs Step S108 described above.

The robot system 100 according to Embodiment 4 described above has similar operation and effects to the robot system 100 according to Embodiment 1 described above.

It is apparent for the person skilled in the art that many improvements or other embodiments of the present disclosure are possible from the above description. Therefore, the above description is to be interpreted only as illustration, and it is provided in order to teach the person skilled in the art the best mode that implements the present disclosure. The details of the structures and/or the functions may be changed substantially, without departing from the present disclosure.

DESCRIPTION OF REFERENCE CHARACTERS

11a First Link
11b Second Link
11c Third Link
11d Fourth Link
11e Fifth Link
11f Sixth Link
12 Detector
13 Transmitter
15 Pedestal
20 End Effector
21 Piping
30 Line
100 Robot System
101 Robot
101A 3D Robot
102 Interface
102A Gripper
102B Switch
102E Interface Body
104 Sensor
105 Display
106 Conveying Device
107 Shutter
110 Control Device
150 Alarm
201 Workarea
202 Manipulation Area
203 Wall Member
204 Window
300 Workpiece
301 3D Workpiece
JT1 First Joint
JT2 Second Joint
JT3 Third Joint
JT4 Fourth Joint
JT5 Fifth Joint
JT6 Sixth Joint

The invention claimed is:

1. A robot system, comprising:
a robot inside a work area;
an interface;
a display; and
control circuitry,
wherein when operating the robot to perform a kind of work defined beforehand to a workpiece based on manipulational command information on the robot inputted from the interface, the control circuitry displays on the display a spatial relationship between the workpiece and the robot in a state where the workpiece and the robot are seen from a direction different from a direction in which an operator looks at the robot from a manipulation area that is a space different from the work area, based on three-dimensional model information on the workpiece, three-dimensional model information on the robot, and the manipulational command information.

2. The robot system of claim 1, wherein the different direction is a direction perpendicular to the direction in which the operator looks at the robot from the manipulation area.

3. The robot system of claim 1, further comprising a conveying device that conveys the workpiece to a first position set beforehand in the work area.

4. The robot system of claim 1, further comprising a sensor that is disposed in the manipulation area, and wirelessly detects position information and posture information on the interface,
wherein the control circuitry calculates a locus of the interface based on the position information and the posture information detected by the sensor, and
wherein the control circuitry causes the robot to perform the work by operating the robot on real time based on the calculated locus.

5. The robot system of claim 1, wherein the control circuitry further includes a memory that stores three-dimensional model information on a scale indicative of a first range set beforehand, and
wherein the control circuitry displays a three-dimensional model of the scale at a tip end of an end effector of the robot displayed on the display.

6. The robot system of claim 1, wherein the control circuitry displays on the display a line indicative of a normal direction to a first part set beforehand in the workpiece, based on the three-dimensional model information on the workpiece, and
wherein when the line becomes in agreement with an axial center direction of an end effector of the robot, the control circuitry changes at least one of a color and a thickness of the line, and displays the changed line on the display.

7. The robot system of claim 6, further comprising an alarm,
  wherein when the line becomes in agreement with the axial center direction of the end effector of the robot, the control circuitry activates the alarm.

8. The robot system of claim 6, wherein the first part is a part opposing to a tip end of the end effector.

9. The robot system of claim 1, further comprising an alarm,
  wherein when a distance between the robot and the workpiece is less than a first distance set beforehand, the control circuitry activates the alarm.

* * * * *